Patented Dec. 16, 1924.

1,519,907

UNITED STATES PATENT OFFICE.

ALBERT EDMONDSON, OF WARE, MASSACHUSETTS.

CLEANING AND POLISHING COMPOSITION.

No Drawing. Application filed February 24, 1922. Serial No. 539,027.

*To all whom it may concern:*

Be it known that I, ALBERT EDMONDSON, a citizen of the United States, residing at Ware, in the county of Hampshire and State of Massachusetts, have invented new and useful Improvements in Cleaning and Polishing Compositions, of which the following is a specification.

My said invention has for its object the provision of an inexpensive and efficient cleaning and polishing composition designed especially for mirrors, glass, automobiles, jewelry, porcelain ware, enamel ware and other articles, plated ware included, having smooth and polished surfaces.

To the attainment of the foregoing, the invention consists in a composition including a mixture of Glauber salts, glycerine and water to be applied to the surfaces of the articles to be cleaned and polished.

In preparing the composition I prefer to use the ingredients in approximately the following proportions, viz, 2 drams avoirdupois of Glauber salts, 1 fluid ounce of glycerine, and sufficient water to make one (1) gallon of the composition. The Glauber salts and the glycerine are dissolved in the water.

In practice the composition is applied to and rubbed over the articles to be cleaned and polished and will be highly efficient for the purpose.

In virtue of Glauber salts being employed in composition, the polishing can be quickly and easily effected, and a perfectly transparent polish, as contradistinguished from a greasy polish produced.

The glycerine in the composition promotes ready and thorough removal of the composition from the article that is being cleaned and polished.

In the preferred embodiment of the invention the composition is marketed ready for use—i. e., as made up of Glauber salts, glycerine and water.

Having described my invention, what I claim and desire to secure by Letters-Patent, is:—

1. A liquid composition adapted for cleaning and polishing purposes consisting of Glauber salts and glycerine.

2. A liquid composition adapted for cleaning and polishing purposes consisting of Glauber salts and glycerine; the said ingredients being commingled in the proportions of two drams of Glauber salts and one fluid ounce of glycerine.

In testimony whereof I affix my signature.

ALBERT EDMONDSON.